(12) United States Patent  
Mikladal et al.

(10) Patent No.: US 9,395,851 B2  
(45) Date of Patent: Jul. 19, 2016

(54) TOUCH SENSITIVE FILM AND A TOUCH SENSING DEVICE

(75) Inventors: Bjorn Friour Mikladal, Helsinki (FI); David P. Brown, Helsinki (FI); Bradley J. Aitchison, Helsinki (FI)

(73) Assignee: CANATU OY, Helsinki (FI)

( * ) Notice: Subject to any disclaimer, the term of this patent is extended or adjusted under 35 U.S.C. 154(b) by 0 days.

(21) Appl. No.: 13/582,865

(22) PCT Filed: Mar. 7, 2011

(86) PCT No.: PCT/FI2011/050197  
§ 371 (c)(1),  
(2), (4) Date: Sep. 5, 2012

(87) PCT Pub. No.: WO2011/107666  
PCT Pub. Date: Sep. 9, 2011

(65) Prior Publication Data  
US 2012/0327004 A1    Dec. 27, 2012

(30) Foreign Application Priority Data

Mar. 5, 2010  (FI) .................................. 20105216  
May 7, 2010   (FI) .................................. 20100198  
Jun. 24, 2010 (FI) .................................. 20100267

(51) Int. Cl.  
    *G06F 3/044* (2006.01)

(52) U.S. Cl.  
    CPC ..................................... *G06F 3/044* (2013.01)

(58) Field of Classification Search  
    CPC ...... G06F 3/044; G08C 21/00; H03K 17/962; H03K 17/975; H01H 2239/006  
    USPC ................ 345/173; 200/600; 178/18.01  
    See application file for complete search history.

(56) References Cited

U.S. PATENT DOCUMENTS

| 7,211,885 B2 * | 5/2007 | Nordal et al. ................. 257/686 |
| 7,473,411 B2 | 1/2009 | Ajayan et al. |
| 7,477,242 B2 | 1/2009 | Cross et al. |
| 2001/0040733 A1 | 11/2001 | Toyoshima et al. |
| 2003/0022701 A1 * | 1/2003 | Gupta ........................... 455/566 |
| 2004/0188150 A1 | 9/2004 | Richard et al. |
| 2005/0012831 A1 | 1/2005 | Yano |
| 2005/0073507 A1 | 4/2005 | Richter et al. |
| 2005/0076824 A1 | 4/2005 | Cross et al. |
| 2005/0126831 A1 | 6/2005 | Richter et al. |
| 2006/0003097 A1 | 1/2006 | Andres et al. |

(Continued)

FOREIGN PATENT DOCUMENTS

| DE | 102007016995 A1 | 10/2008 |
| EP | 2071631 A2 | 6/2009 |

(Continued)

OTHER PUBLICATIONS

An International Search Report, dated Jul. 6, 2011 in International Application No. PCT/FI2011/050197.

(Continued)

*Primary Examiner* — Kumar Patel  
*Assistant Examiner* — Vinh Lam  
(74) *Attorney, Agent, or Firm* — Hauptman Ham, LLP

(57) ABSTRACT

A capacitive touch sensitive film comprises a conductive layer having a sensing region. According to the present invention, the sheet resistance of the conductive layer in the sensing region is higher than or equal to 3 kΩ.

13 Claims, 4 Drawing Sheets

(56) References Cited

U.S. PATENT DOCUMENTS

| | | |
|---|---|---|
| 2006/0073089 A1 | 4/2006 | Ajayan et al. |
| 2006/0274048 A1 | 12/2006 | Spath et al. |
| 2006/0274049 A1 | 12/2006 | Spath et al. |
| 2006/0276056 A1 | 12/2006 | Ward et al. |
| 2007/0236325 A1* | 10/2007 | Bertin .................. H01C 7/005 338/195 |
| 2008/0048996 A1 | 2/2008 | Hu et al. |
| 2008/0284755 A1* | 11/2008 | Hardie-Bick ................. 345/177 |
| 2009/0079550 A1 | 3/2009 | Makinen et al. |
| 2009/0085894 A1* | 4/2009 | Gandhi et al. ................ 345/175 |
| 2009/0109007 A1 | 4/2009 | Makinen et al. |
| 2009/0128512 A1* | 5/2009 | Segev et al. ................... 345/174 |
| 2009/0167711 A1* | 7/2009 | Jiang et al. .................... 345/173 |
| 2009/0169463 A1* | 7/2009 | Smalley et al. ........... 423/445 B |
| 2009/0201268 A1* | 8/2009 | Endo et al. .................... 345/174 |
| 2009/0267914 A1 | 10/2009 | Dews et al. |
| 2009/0277696 A1 | 11/2009 | Reynolds et al. |
| 2010/0143726 A1 | 6/2010 | Golzhauser et al. |
| 2010/0220074 A1 | 9/2010 | Irvin, Jr. et al. |
| 2011/0074733 A1 | 3/2011 | Makinen et al. |
| 2011/0214728 A1* | 9/2011 | Veerasamy ............ B82Y 10/00 136/256 |
| 2013/0004765 A1* | 1/2013 | Zou ........................ C09D 5/084 428/341 |

FOREIGN PATENT DOCUMENTS

| | | |
|---|---|---|
| JP | 2007508618 A | 4/2007 |
| JP | 2009087359 A | 4/2009 |
| JP | 2009282865 A | 12/2009 |
| JP | 2010049692 A | 3/2010 |
| WO | 03013199 A2 | 2/2003 |
| WO | 2005085130 A2 | 9/2005 |
| WO | 2007101906 A1 | 9/2007 |
| WO | 2007149252 A2 | 12/2007 |
| WO | 2009000969 A1 | 12/2008 |
| WO | 2009037379 A1 | 3/2009 |
| WO | 2009137155 A1 | 11/2009 |

OTHER PUBLICATIONS

An International Preliminary Report on Patentability, dated Apr. 3, 2012 in International Application No. PCT/FI2011/050196.
Japanese Office Action dated May 12, 2015.
Chinese Office Action dated Mar. 12, 2014.
Japanese Office Action dated Dec. 3, 2014.

* cited by examiner

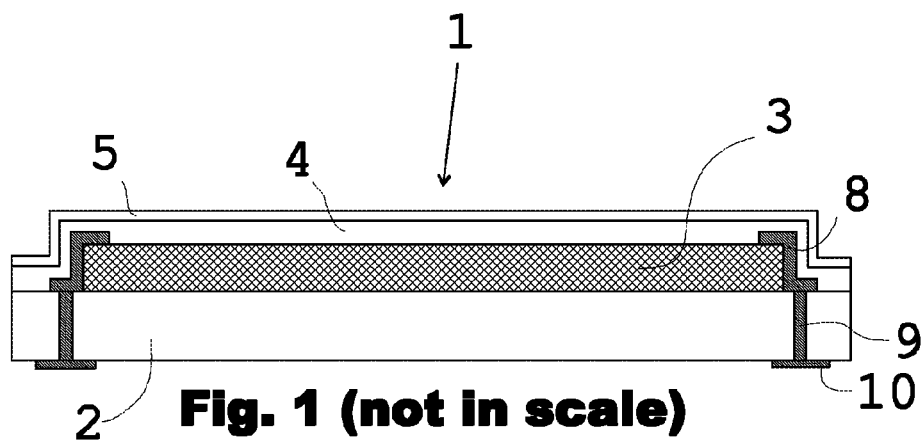
Fig. 1 (not in scale)
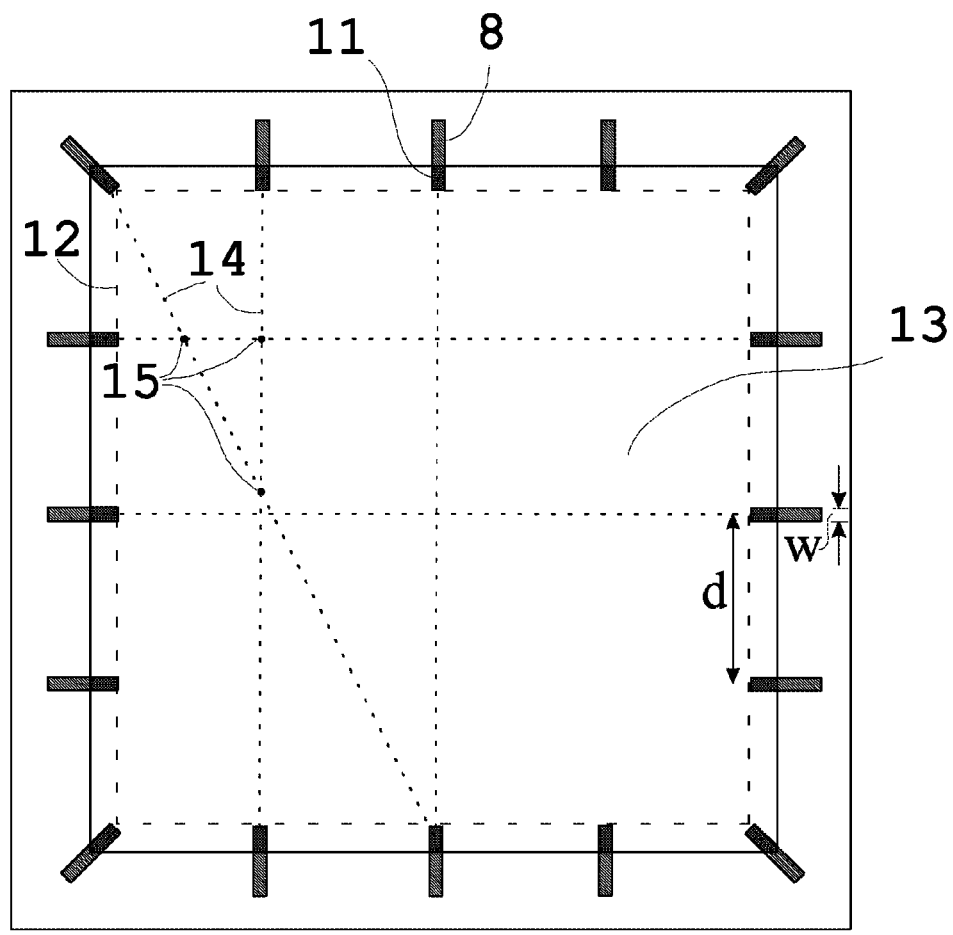
Fig. 2 (not in scale)

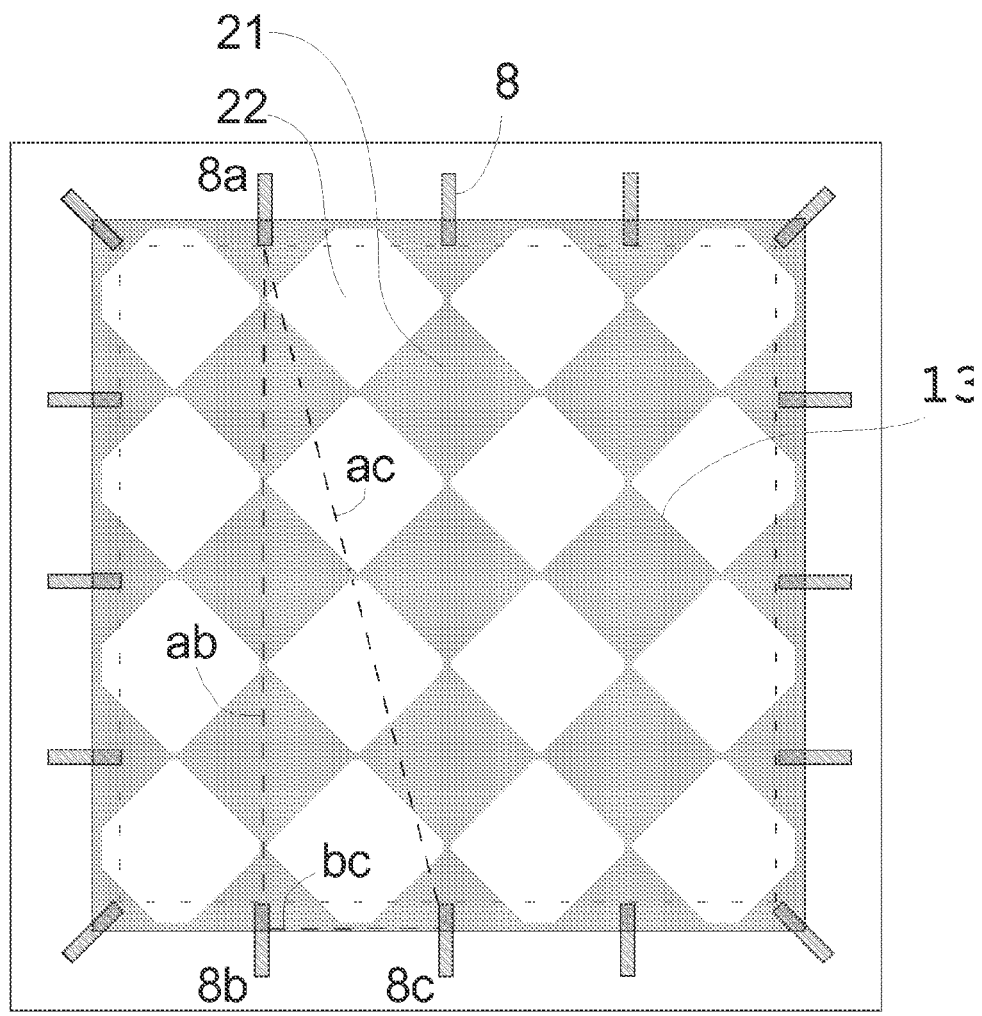
Fig. 7 (not in scale)

TOUCH SENSITIVE FILM AND A TOUCH SENSING DEVICE

RELATED APPLICATIONS

The present application is based on International Application No. PCT/FI2011/050197, filed Mar. 7, 2011 and claims priority from, Finnish Application Nos. 201005216, filed Mar. 5, 2010; 20100198, filed May 7, 2010 and 20100267, filed Jun. 24, 2010.

FIELD OF THE INVENTION

The present invention relates to touch sensitive films, and touch sensing devices utilizing touch sensitive films.

BACKGROUND OF THE INVENTION

User interfaces for different kinds of electrical apparatuses are nowadays more and more often realized by means of different types of touch sensing devices based on touch sensitive films instead of conventional mechanical buttons. Different kinds of touch pads and touch screens of e.g. mobile phones, portable computers and similar devices are well known examples of these. In addition to the sophisticated and even luxurious user experience achievable, touch sensing devices based on touch sensitive films also provide a superior freedom to the designers continuously trying to find functionally more versatile, smaller, cheaper, lighter, and also visually more attractive devices.

A key element in such touch sensing devices is a touch sensitive film comprising one or more conductive layers configured to serve as one or more sensing electrodes. The general operating principle of this kind of film is that the touch of a user by e.g. a fingertip or some particular pointer device changes the electrical properties of an electrical measuring circuitry to which the touch sensitive film is connected. The actual measuring principle can be e.g. resistive or capacitive, the latter one being nowadays usually considered the most advanced alternative providing the best performance in the most demanding applications.

Capacitive touch sensing is based on the principle that a touch on a touch sensitive film means, from electrical point of view, coupling an external capacitance to the measurement circuitry to which the touch sensitive film is connected. With sufficiently high sensitivity of the touch sensitive film, even no direct contact on the touch sensitive film is necessitated but a capacitive coupling can be achieved by only bringing a suitable pointer to the proximity of the touch sensitive film. The capacitive coupling is detected in the signals of the measurement circuitry.

Conventionally, the capacitive touch sensitive films have been configured as two-layer structures. Typically, each of the two conductive layers is patterned into separate parallel lines or otherwise shaped sensing electrodes. Particularly in the case of line-shaped or elongated sensing electrodes, the electrodes in the two layers are most often arranged orthogonally with respect to each other. A drive signal is supplied into the sensing electrodes of one of the layers while signals capacitively coupled to the other layer are measured via the sensing electrodes of this layer. From operative point of view, the electrodes used for supplying the signal and sensing the capacitive coupling are often called drive electrodes and sense electrodes, respectively. A touch changes the capacitive coupling between the electrodes of the two layers, the change being biggest between the electrodes lying in or near the area of the touch. Usually, the measurement circuitry is arranged to rapidly scan over the sensing electrodes sequentially so that coupling between each supplying/measuring electrode pair is measured.

Recently, also some single-layer capacitive touch sensor configurations have been proposed. In a single-layer configuration, a touch changes electrical coupling of the signals within one single conductive layer and/or between this layer and the ambient. One example of the single-layer approach is disclosed in U.S. Pat. No. 7,477,242 B2. The key feature of the device disclosed therein is use of a conductive polymer as the material of the conductive layer instead of the conductive oxides conventionally used in capacitive touch sensing films of touch screens.

Common for the known touch sensitive films is that the need to properly determine the location of the touch necessitates a high number of separate sensing electrodes in the conductive layers. In other words, the conductive layers are patterned into a network of separate sensing electrodes. The more accurate resolution desired the more complex sensing electrode configuration is needed. One particularly challenging issue is detection of multiple simultaneous touches which, on the other hand, often is one of the most desired properties of the touch sensing devices. Complex sensing electrode configurations and high numbers of single sensing electrode elements complicates the manufacturing process as well as the measurement electronics of the touch sensing device.

In touch screens, in addition to the touch sensing capability, the touch sensitive film must be optically transparent to enable use of the film on top of a display of an electronic device, i.e. to enable the display of the device to be seen through the touch sensitive film. Moreover, transparency is also very important from the touch sensitive film visibility point of view. Visibility of the touch sensitive film to the user of e.g. an LCD (Liquid Crystal Display), an OLED (Organic Light Emitting Diode) display, or an e-paper (electronic paper) display seriously deteriorates the user experience. So far, transparent conductive oxides like ITO (Indium Tin Oxide) have formed the most common group of the conductive layer materials in touch sensitive films. However, from the visibility point of view, they are far from an ideal solution. The high refractive index of e.g. ITO makes the patterned sensing electrodes visible. The problem is emphasized as the sensing electrode patterning becomes more complicated.

One promising new approach in touch sensitive films is found in layers formed of or comprising networked nanostructures. In addition to a suitable conductivity performance, a layer consisting of networks of e.g. carbon nanotubes (CNT), or carbon NANOBUDs having fullerene or fullerene-like molecules covalently bonded to the side of a tubular carbon molecule (NANOBUD® is a registered trade mark of Canatu Oy), are clearly less visible to a human eye than e.g. transparent conductive oxides like ITO. Besides, as is well known, nanostructure-based layers can possess flexibility, mechanical strength and stability superior in comparison with e.g. ITO.

One nanostructure-based solution is reported in US 2009/0085894 A1. According to the description thereof, the nanostructures can be e.g. different types of carbon nanotubes, graphene flakes, or nanowires. Doping of the film is mentioned as a means for increasing the electrical conductivity thereof. Both two-layer configurations based on mutual capacitance and single-layer self-capacitance approaches are discussed. Multiple touch detection is stated to be possible by means of the films disclosed. However, also this document involves the common problem of very complex electrode and measurement circuitry configurations.

Other touch screen solutions based on nanostructure networks are disclosed in US 2008/0048996 A1. The document mainly discusses layers of nanostructure networks in touch sensitive devices relying on resistive measuring principles. Also a capacitive, apparently single layer approach with a non-patterned conductive layer is shortly discussed and illustrated in a figure, however more or less just as a principle of a desired target without any real description about the implementation thereof in practice.

To summarize, there is still a strong demand in the market for further enhanced touch sensitive films and touch sensing devices, preferably enabling single-layer capacitive operation principle with a simple sensing electrode configuration and multi-touch sensing capability.

Moreover, there is also a need in the market to provide touch sensitive films and touch sensing devices with versatile properties enabling detection of various types of pointers or other objects coupling to the touch sensitive film in various ways. For example, it would be advantageous if the touch sensitive films and touch sensing devices could be used to detect not only objects being coupled to the touch sensitive film capacitively but also, for example, objects coupled to the touch sensitive film inductively.

PURPOSE OF THE INVENTION

The purpose of the present invention is to provide novel solutions for the above-defined demand.

SUMMARY OF THE INVENTION

The present invention is characterized by what is presented in claims 1 and 9.

The first aspect of the present invention is focused on a touch sensitive film comprising a conductive layer having a sensing region.

A touch sensitive film means, in general, a film which can be used as a touch sensitive element in a touch sensing device. A touch sensing device is to be understood here broadly to cover all user interface devices operated by touching the device e.g. by a fingertip or a stylus, as well as other types of devices for detecting the presence and location of such pointers or other objects. As explained in more detail below, by "touching" is meant here not only physical contact between the touching element and the touch sensitive film, but also a sufficient proximity between them. In operation, when a touch sensitive film is connected as a part of a suitably configured electrical measurement circuitry of a touch sensing device, a touch of an object on the film, or the presence of an object in the proximity of the film, causes a change in one or more electrical properties in the circuitry, based on which the touch can be detected and preferably also its location on the touch sensitive film determined. In practice, this change is detected by supplying an excitation signal to, and receiving a response signal from the touch sensitive film, and monitoring the changes of the latter.

The touch sensitive film of the present invention can be a capacitive touch sensitive film. A capacitive touch sensitive film means here a touch sensitive element by using which the detection of a touch can be primarily based on capacitive sensing principle. A capacitive sensing principle or capacitive operation of a touch sensitive film means that, when the touch sensitive film is connected to a proper sensing circuitry, a touch can be detected based on the changes a touch causes in the capacitive coupling between the touch sensitive film and the ambient, or between different points of the touch sensitive film. On the other hand, the touch sensitive film of the present invention can also operate inductively. By inductive operation is meant here, that an object induces an inductive coupling between the touch sensitive film and the ambient, or between different points of the touch sensitive film. In other words, capacitive or inductive coupling can also be seen as coupling to the touch sensitive film an external capacitance or inductance, respectively. To summarize, the touch sensitive film of the present invention can be a capacitive touch sensitive film, an inductive touch sensitive film, or a touch sensitive film capable of detecting both capacitive and inductive coupling of an object to the touch sensitive film.

As indicated above, the word "touch" and derivatives thereof are used in the context of the present invention in a broad sense covering not only a direct mechanical or physical contact between the fingertip, stylus, or some other pointer or object and the touch sensitive film, but also situations where such an object is in the proximity of the touch sensitive film so that the object generates sufficient capacitive or inductive coupling between the touch sensitive film and the ambient, or between different points of the touch sensitive film. In this sense, the touch sensitive film of the present invention can also be used as a proximity sensor.

The actual application where the touch sensitive film of the present invention is used is not essential for the principles of the invention. Perhaps the commercially most attractive application is a touch sensing device which is not only capable of detecting the presence of one touch and determining the location thereof but also capable of detecting and locating multiple simultaneous touches.

A conductive layer is a layer formed of one or more electrically conductive materials. By "conductive" is meant here any material capable of allowing flow of electric charge in the material, irrespective of the conductivity mechanism or conductivity type of the material. Thus, "conductive" covers here, for instance, also semiconductive or semiconducting materials. In the operation of the touch sensitive film as a part of a touch sensing device, the excitation signals are supplied to and the response signals are measured from one or more conductive layers. The sensing region within a conductive layer is the "active" or operating portion of the conductive layer, i.e. the region within which the actual touch sensing operation is to be performed. Touch sensing region can also cover the entire area of the conductive layer. There can be one or more conductive layers in a touch sensitive film, and a conductive layer can have one or more sensing regions.

In addition to the conductive layer, the touch sensitive film can comprise also other layers and structures needed to implement an entire working touch sensitive element. For example, there can be one or more layers for mechanical protection of the film. Moreover, there can be also one or more layers for refractive index or color matching, and/or one or more coatings, for instance, for anti-scratch, decorative, self-cleaning, or other purposes. Besides the layered elements, the touch sensitive film can also comprise three-dimensionally organized structures, e.g. contact structures extending through the touch sensitive film or a portion thereof.

According to the present invention, the sheet resistance of the conductive layer in the sensing region is higher than or equal to 3.0 k$\Omega$. By sheet resistance it is meant here the standard definition thereof, i.e. the DC (direct current) resistance of a square-form film or layer. As an alternative to the notation used in this document expressing the sheet resistance in terms of ohms ($\Omega$), the sheet resistance can also be expressed in terms of ohms per square (e.g. $\Omega$/square, $\Omega$/sq, or $\Omega/\square$).

This high DC resistivity is a radical change in comparison to the prior art. For example, U.S. Pat. No. 7,477,242 B2 presents that capacitive touch sensing systems typically require sheet resistances of the conductive films in the range of 1000 to 2500Ω. Particularly in nanostructure-based conductive layers for touch sensing applications, the earlier efforts for improving the touch sensing performance by optimizing the conductivity/resistivity of the conductive layer have been mainly focused on trying to increase the conductivity, i.e. to lower the resistivity, e.g. by means of doping the nanostructure network. As an example, US 2009/0085894 A1 describes treatments for "improving" the sheet resistance values of nanostructure films for capacitive touch sensing devices by lowering them from 1000Ω to as low values as 131 and 230Ω.

The high sheet resistance range according to the present invention is based on the surprising observation by the inventors that increasing the sheet resistance of the conductive layer in the sensing region from what is typical in prior art to the claimed range enables one to achieve excellent sensitivity and touch location resolution performance of the touch sensitive film. These properties are very useful particularly in multi-touch detection. Moreover, it has been found by the inventors that the touch sensitive films according to the present invention enable also detecting the presence and location of objects being coupled to the touch sensitive film inductively. Different types of metallic objects, e.g. metallic coils, which are typically difficult to detect by means of the conventional capacitive touch sensors, are examples of these.

The most suitable sheet resistance of the conductive layer depends, to some extent, on the frequency of the excitation and response signals supplied to and received from the sensing region(s) of the conductive layer(s). In general, a higher resistivity allows use of a lower frequency. Optimal frequency, for its turn, depends on many factors. Noise increases with lowering the frequency. On the other hand, antenna effects disturbing the touch detection becomes a problem with too high frequencies. By antenna effects is meant here that the different parts of the measurement circuitry act like antennas tending to couple disturbance signals between the circuitry and the ambient. In addition to the frequency, the inventors believe also that in order to maximize the sensitivity of the touch sensitive film, the resistivity of the conductive layer should suitably match the (frequency-dependent) reactance the touch couples to the conductive layer. From the touch detection sensitivity point of view, it has been found that there typically is an optimum frequency range between a lower and an upper cut-off frequency. This range depends, for example, on the sheet resistivity of the conductive layer in the sensing region and the material of the substrate on which the conductive layer lies. For example, with a sufficient high frequency, a PET substrate becomes conductive, thereby interfering the excitation and response signals. Taking into account all these aspects, the above-determined resistivity range is found by the inventors appropriate for a great variety of embodiments and applications. With conductive layers having their resistivity within this range, excellent touch sensing performance have been achieved, for example, with frequencies in the range of 10 kHz to 5 Mhz. In general, higher frequencies enable better resolution. However, with too high frequencies, capacitive coupling occurs between the conductive layer and the substrate on which the conductive layer lies, thus deteriorating the touch detection sensitivity.

In a preferred embodiment of the present invention, the sheet resistance is within a range of 5 to 100 kΩ, preferably within a range of 10 to 50 kΩ, most preferably in the range of 10 to 20 kΩ. These are even more preferred values for maximizing the sensitivity and touch location resolution performance of the touch sensitive film. Increasing the resistivity increases the noise in the measurements as well as different electromagnetic interference effects, which can set an upper limit for the sheet resistance according to the overall conditions of each specific application.

In most of the prior art capacitive touch sensitive films, the conductive layers are patterned to form a grid of separate sensing electrode elements. In contrast, the advantages in sensitivity and touch location resolution of the present invention are particularly effective in a preferred embodiment where the conductive layer extends as a solid, i.e. a continuous, non-interrupted, and non-patterned structure substantially over the entire sensing area. This feature, enabled by the superior sensitivity of the conductive layer, not only minimizes the visibility of the conductive layer but also simplifies the manufacturing thereof when no patterning of the layer is needed. It also simplifies the electronics of a touch sensing device having a touch sensitive film according to this embodiment.

Moreover, the sensitivity and touch location resolution performance of the touch sensitive film according to the present invention enable use of such a non-patterned conductive layer even in a single-layer operation mode. Operation in a single-layer mode means that only one single conductive layer is used in touch sensing measurements. In other words, all the signals used in touch detection are then supplied to and received from the one single conductive layer. Single-layer capability combined with the possibility to have the conductive layer as a solid structure extending over the entire sensing region opens entirely novel possibilities for touch sensing device designing and manufacturing. Even multi-touch detection capability in a single-layer operation mode and with a non-patterned conductive layer is possible. Single-layer capability as such also allows producing the entire touch sensitive film as a rather thin structure.

In one embodiment, the sensing region comprises at least one first sub-region having a first sheet resistance, and at least one second sub-region having a second sheet resistance deviating from the first sheet resistance. This kind of modulated resistivity can increase the touch sensing accuracy achievable by the touch sensitive film.

The conductive layer can be formed of any material having a resistivity within one of the above-defined sheet resistance ranges. Possible groups of materials are formed, for example, by different conductive polymers and metal oxides. On the other hand, in one preferred embodiment, the conductive layer comprises a High Aspect Ratio Molecular Structure (HARMS) network. By HARMS or HARM structures is meant here electrically conductive structures with characteristic dimensions in nanometer scale, i.e. dimensions less or equal than about 100 nanometers. Examples of these structures include carbon nanotubes (CNTs), carbon NANOBUDs (CNBs), metal nanowires, and carbon nanoribbons. In a HARMS network a great number of these kinds of single structures, e.g. CNTs, are interconnected with each other. In other words, at a nanometer scale, the HARM-structures do not form a truly continuous material, such as e.g. the conductive polymers or ITO, but rather a network of electrically interconnected molecules. However, as considered at a macroscopic scale, a HARMS network forms a solid, monolithic material. As an essential feature, HARMS networks can be produced in the form of a thin layer.

The advantages achievable by means of the HARMS network(s) in the conductive layer include excellent mechanical durability and high optical transmittance useful in applications requiring optically transparent touch sensitive films, but also very flexibly adjustable electrical properties. To maximize these advantages, the conductive layer can be substantially entirely formed of one or more HARMS networks.

The resistivity performance of a HARMS network is dependent on the density (thickness) of the layer and, to some extent, also on the HARMS structural details like the length, thickness, or crystal orientation of the structures, the diameter of nanostructure bundles etc. These properties can be manipulated by proper selection of the HARMS manufacturing process and the parameters thereof. Suitable processes to produce conductive layers comprising carbon nanostructure networks with sheet resistances in the range according to the present invention are described e.g. in WO 2005/085130 A2 and WO 2007/101906 A1 by Canatu Oy. More detailed description about achieving the resistivity values according to the present invention is presented later in this document in the detailed description of the present invention.

In one preferred embodiment, the touch sensitive film is formed as a flexible structure so as to allow bending thereof along a three dimensional surface. A "flexible" structure means here a structure allowing bending, preferably repeatedly, in at least one direction with a radius of curvature below 10 mm, more preferably below 5 mm. Preferably, the touch sensitive film is flexible in at least two directions simultaneously.

Instead of or in addition to the flexibility, the touch sensitive film can also be formed as a deformable structure so as to allow deforming thereof, e.g. by using thermoforming, along a three dimensional surface.

Flexibility and/or deformability of the touch sensitive film in combination with the unique sensitivity performance thereof opens entirely novel possibilities to implement touch sensing devices. For example, a touch sensitive film serving as the user interface of a mobile device can be bent or formed to extend to the device edges so that the touch sensitive film can cover even the entire surface of the device. In a touch sensitive film covering different surfaces of a three-dimensional device, there can be several touch sensing regions for different purposes. One sensing region can cover the area of a display to form a touch screen. Other sensing regions e.g. at the sides of the device can be configured to serve as touch sensitive element replacing the conventional mechanical buttons, e.g. the power button.

A good choice for flexible and/or deformable touch sensitive films is a conductive layer comprising one or more HARMS networks. HARM structures and the networks thereof are inherently flexible, thus enabling making the touch sensitive film bendable and/or deformable.

Preferably, the touch sensitive film is optically transparent, thus enabling use of the touch sensitive film e.g. as part of a touch screen. Optical transparency of the touch sensitive film means here that at least 10%, preferably at least 90% of the incident radiation from a direction substantially perpendicular to the plane of the film, at the frequency/wavelength range relevant in the application at issue, is transmitted through the film. In most touch sensing applications, this frequency/wavelength range is that of visible light.

For the optical transparency, the key layer of a touch sensitive film is the conductive layer. The requirement of simultaneous electrical conductivity and optical transparency limits the number of possible materials for that layer. In this sense, a conductive layer comprising one or more HARMS networks forms a good basis for an optically transparent touch sensitive film because the HARMS networks can provide a transparency superior to that of the transparent conductive oxides, for example.

The second aspect of the present invention is focused on a touch sensing device comprising a touch sensitive film, the device further comprising circuitry means for supplying an electrical excitation signal to and receiving an electrical response signal from the touch sensitive film, and processing means for processing the electrical response signal received from the touch sensitive film for detecting a touch on the basis of the effects of the touch on the response signal. Thus, by a touch sensing device is meant here an entire operable device comprising, in addition to the touch sensitive film, also other elements like measurement electronics and measurement algorithm software therein necessitated to carry out the touch sensing operations.

The circuitry means can comprise different types of contact electrodes, wirings and other form of conductors, switches, and other elements needed to connect the touch sensitive film and the one or more conductive layers thereof to the rest of the touch sensing device. Correspondingly, the processing means can comprise any hardware and electronics as well as software tools for generating and controlling signals needed in operating the touch sensitive film. They can also comprise any means to measure, collect, and process response signals in order to detect and locate touches on the touch sensitive film. The circuitry means and the control means can be implemented by means of known components, elements and principles.

An excitation signal means here any electrical signal for being coupled to the conductive layer of the touch sensitive film via the circuitry means and providing conditions suitable for monitoring the changes a touch induces in these conditions. The excitation signal could also be called, for example, a drive signal or a stimulation signal. Typical examples are AC current and voltage. A response signal is correspondingly any electrical signal measured from a conductive layer by using the circuitry means and allowing detection of a touch on the basis of changes the touch causes to this signal.

The touch sensing device of the present invention can be implemented as a standard or customized stand-alone module or as an non-separable unit integrated as a part of some larger device, e.g. a mobile phone, portable computer, e-reader, electronic navigator, gaming console, car dashboard or steering wheel, etc.

According to the second aspect of the present invention, the touch sensitive film of the touch sensing device is a touch sensitive film according to the first aspect of the present invention, the principles of and the advantages of which having been discussed above.

The unique touch sensitivity properties of a touch sensitive film according to the first aspect of the present invention are particularly efficiently utilized in a preferred embodiment of the touch sensing device where the circuitry means are configured to supply electrical excitation signals to a sensing region of a conductive layer, and to receive electrical response signals from the same sensing region. In other words, in this embodiment, the touch sensing device is configured to enable operation in a single-layer mode utilizing one single conductive layer only. This is a radical simplification in comparison to most prior art capacitive touch sensitive films utilizing a two-layer approach using different conductive layers for the excitation and the response signals.

In one example of operating a touch sensing device according to the embodiment above, an alternating current or voltage as an excitation signal is coupled to the sensing region of a conductive layer at one point thereof and alternating voltage or current as a response signal is measured at another point of the same sensing region. This arrangement corresponds to supplying a signal to an input of a filter and monitoring by measuring at an output thereof how the signal is changed when passing through the filter. Alternatively, the touch sensing measurements can be performed e.g. as an impedance measurement, i.e. by using current or voltage between two points of the conductive layer as an excitation signal and measuring then voltage or current, respectively, between these points as the response signal. Moreover, also a signal coupled to a portion of a conductive layer between two points thereof, in the presence of an excitation signal supplied between another pair of electrodes, can be measured as a response signal. This arrangement can be used also in a two-layer operation mode.

A particularly advantageous embodiment of the touch sensing device of the present invention is achieved when the single-layer operation mode capability is combined with a solid non-patterned structure of the conductive layer in the sensing region to provide a single-layer non-patterned touch sensor configuration.

In a preferred embodiment of the touch sensing device configured for single-layer operation, the processing means is configured to determine the phase displacement between the response signal and the excitation signal for detecting a touch within the sensing region on the basis of the change the touch produces in said phase displacement. Naturally, in this embodiment the excitation signal must comprise an alternating current or voltage portion because there simply is no phase associated with DC signals. The signal form is not essential; sinusoidal voltage or current can be used but triangle or square waves, for example, are also suitable. Moreover, the excitation signal can be a single pulse or a burst of a plurality of pulses of any signal form. As described above, the excitation signal can be current or voltage coupled to the conductive layer at one point thereof, wherein current or voltage at another point of the conductive layer can be measured as the response signal. A signal passing through a conductive layer between two points thereof always experiences, in addition to the amplitude attenuation, some phase displacement due to the parasitic capacitance and/or inductance both within the conductive layer and between it and the ambient. This embodiment of the present invention is based on the observation by the inventors that with a conductive layer sheet resistance according to the present invention, particularly in the case of a conductive layer comprising one or more HARMS networks, the phase displacements of signals passing through the conductive layer are far more sensitive to touches than the signal amplitudes conventionally used in touch detection. Concentrating on the phase displacement changes instead of the changes in the amplitude enables superior touch sensitivity and touch positioning resolution, which is particularly advantageous in multi-touch operation of the touch sensing device.

Moreover, in addition to operation as a capacitive touch sensing device, monitoring the phase displacement of the response signal also allows operation of the touch sensing device as an inductive touch sensing device detecting inductive coupling of objects on the touch sensitive film.

As a further advantage of monitoring the phase of the response signal instead of the amplitude is that the maximum sensitivity of the response signal phase is achieved with lower frequencies than the corresponding maximum sensitivity of the amplitude. Then, lower signal frequencies can be used.

Touch detection sensitivity and touch location resolution of a touch sensing device do not depend on the properties of the conductive layer and the processing means performance only. Naturally it is also a matter of e.g. the contact electrode configuration. In one preferred embodiment of the touch sensing device configured to allow operation in a single-layer mode, the sensing region is electrically connected to the circuitry means via a plurality of contact regions on the conductive layer, the contact regions defining a borderline encircling the sensing region. Thus, the contact regions form the electrical interfaces between the sensing region and the circuitry means of the device. The contact regions can be e.g. the contact areas between the conductive layer and electrodes attached to it as part of the circuitry means. By borderline is meant here a fictitious line joining together all the contact regions, thus determining a closed periphery line of the sensing region. Further, in this embodiment, as determined in the direction along said borderline, the average distance between the centers of two adjacent contact regions is at least 2 times, more preferably at least 5 times, and most preferably at least 10 times as large as the average width of the contact regions in this same direction.

When a current or voltage is coupled to the sensing region of the conductive layer between two contact regions, the current flow concentrates on the straight connection line between these contact regions. The inventors have found that by separating these connection lines or signal paths according to the contact region spacing as determined above, the resolution of the touch position determination can be maximized.

On the other hand, the touch location resolution of the touch sensitive film and a touch sensing device utilizing it depend also on the number of the contact regions and placing of them with respect to each other. These are critical issues particularly in a single-layer approach with a non-patterned conductive layer. Typically, the prior art devices of this type, described e.g. in U.S. Pat. No. 7,477,242 B2 and US 2008/0048996 A1, rely on a rectangular-shaped conductive layer and four contact electrodes at the corners thereof. However, this configuration necessitates very complex signal processing, and a proper selection of the algorithms is crucial for the performance of the device. Particularly, the multi-touch capability can be very challenging to achieve with that kind of approach.

To avoid such difficulties in touch position determination, in one preferred embodiment of the touch sensing device configured to allow a single-layer operation mode, the number and placing of the contact regions is selected so that when determining a straight connection line over the sensing area between the contact region centers of each pair of two of the contact regions, there is a plurality of intersections of these connection lines within the sensing area. As described above, said imaginary connection lines coincide with the signal paths over the sensing area between the pairs of the electrodes. A touch on or near one of these connection lines or signal paths changes the signal measured from this path more than the signals measured from the other signal paths. This provides information on the touch location on the conductive layer in one direction. In other words, based on this one can determine a "close" connection line, i.e. a connection line on or near which the touch is located. Determining two such "close" connection lines having different directions enable determining the touch location in two directions. In other words, by selecting two or more differently directed "close" connection lines, i.e. connection lines for which the touch causes biggest changes to the response signals in these directions, the touch location can be determined at or near the intersection(s) of these connection lines. This approach, based on utilization of said plurality of connection lines and intersections thereof, greatly simplifies the required touch positioning algorithm in comparison to the prior art devices based on only four contact electrodes, and thus having only one connection line intersection. In principle, the minimum number of contact electrodes producing a plurality, i.e. at least two, of said intersections is five. However, the more there are said intersections the more accurate touch positioning is possible. Preferably, the connection line intersections are distributed substantially uniformly over the entire sensing area.

In one preferred embodiment of the touch sensing device according to the present invention, the touch sensing device comprises means for providing a haptic feedback, preferably via the conductive layer, in response to a touch on the touch sensitive film. Providing the haptic feedback via the conductive layer means that, instead of the conventional approach based on separate actuators attached to the touch sensitive film for generating vibration of the touch sensitive film, the conductive layer is used as a part of the means for generating the haptic feedback. There are various possibilities for this. A haptic effect can be achieved by generating suitable electromagnetic field(s) by means of the conductive layer. The skin of the user touching the touch sensitive film senses these fields as different sensations. This kind of approach can be called capacitive haptic feedback system. On the other hand, the conductive layer can alternatively be used, for instance, as a part of an electroactive polymer (artificial muscle) based haptic interface, wherein the conductive layer forms one layer of the interface.

One possibility to perform the both functions, i.e. the touch detection and haptic feedback, is that the conductive layer is alternately coupled to a touch sensing circuitry and to means for producing the signals for haptic feedback so that once a touch is detected during a first time period, a haptic feedback is then provided at a second time period following the first one. The first and second time periods can be adjusted to be so short that the user experiences the device operating continuously.

As well known in the art, haptic feedback can very significantly improve the user experience of touch sensing device. In known touch sensing devices configured for producing haptic feedback via the conductive layer, high voltages are typically used in generating the haptic feedback effect. Low resistances of the conductive layers of the known devices then lead to high currents through the conductive layer. High currents can induce various problems in the device, for instance excessive power demands or electromagnetic interference with the display or touch sensing circuitries. With the resistivity of the conductive layer in the touch sensing region according to the present invention, the current will be clearly lower, thereby reducing those problems particularly in the case of providing the haptic feedback via the conductive layer.

BRIEF DESCRIPTION OF THE DRAWINGS

The present invention is discussed in more detail in the following with reference to the accompanying figures illustrating examples of preferred embodiments of the present invention.

FIG. 1 is a schematic cross-section showing, as a part of a touch sensing device according to the present invention, a touch sensitive film and electrodes attached thereto.

FIG. 2 shows a schematic view of the layout of a touch sensing device assembly according to that of FIG. 1.

FIG. 7 illustrates the principles of modulated resistivity of the conductive layer according to one embodiment of the present invention.

DETAILED DESCRIPTION OF THE INVENTION

Figure 3:
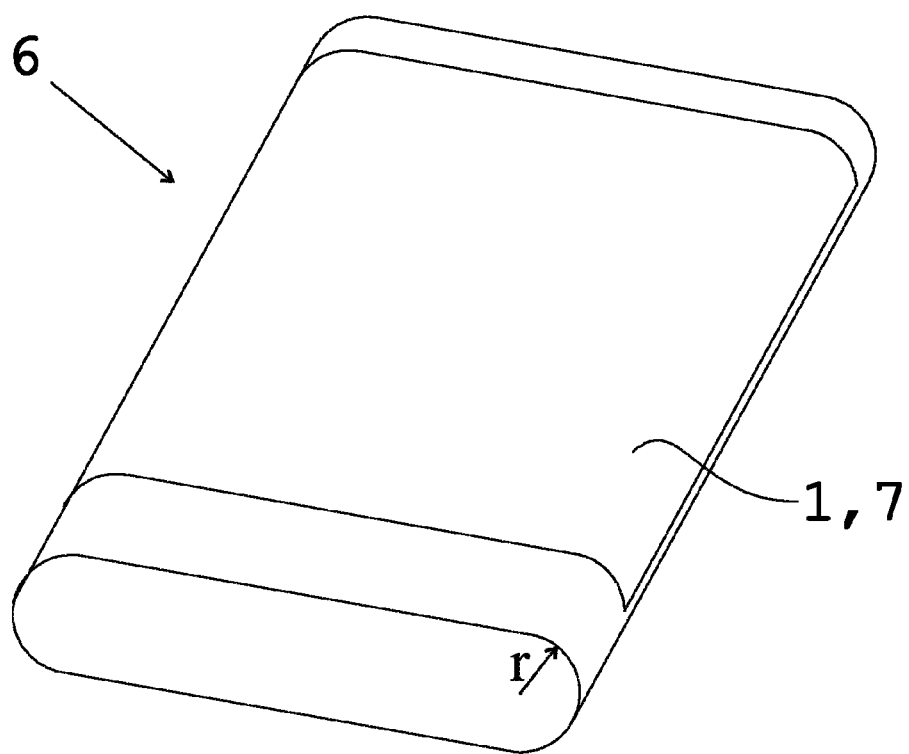
FIG. 3 depicts utilization of a touch sensitive film according to FIG. 1 in a touch screen of a mobile electronic device.

The touch sensitive film 1 shown in FIG. 1 comprises a substrate 2 and a conductive layer 3, the latter being formed of networks of HARM (High Aspect Ratio Molecule) structures, e.g. carbon nanotubes and/or carbon NANOBUDs. The substrate can be made of, for example, polyethylene terephthalate PET. In addition to the HARMS networks, the conductive layer can also comprise suitable species chemically bonded to, physically absorbed on, or otherwise combined with the layer as a dopant to adjust the sheet resistance of the layer. The sheet resistance of the conductive layer 3 is above 3 k$\Omega$ and preferably in the range of 3 to 40 k$\Omega$, e.g. 25 k$\Omega$. As described earlier in this document, these kinds of resistance range and composition of the conductive layer allow a superior touch detection performance of a touch sensing device utilizing such a touch sensitive film. The conductive layer of FIG. 1 can have a thickness of e.g. 5 nm.

The touch sensitive film shown in FIG. 1 and explained herein is an example of an optically transparent touch sensitive film according to the present invention. Optical transparency allows use of the touch sensitive film on a display as a part of a touch screen. However, optical transparency as such is not necessary for implementing the main principles of the present invention, but the touch sensitive film could also be visually opaque. Correspondingly, the materials of the different layers of the touch sensitive film can, naturally, vary from those examples herein proposed.

A conductive layer made of HARMS network and having a resistivity according to the present invention can be produced, for example, according to the principles of HARM structure synthesis and deposition disclosed, for example, in WO 2005/085130 A2, WO 2007/101906 A1, and WO 2009/000969 A1.

The process of producing the HARM structures can be based, for example, on an aerosol synthesis where catalyst particles and one or more carbon sources are introduced in the gas phase into a heated reaction chamber. In the chamber, the catalyst particles are mixed and heated together with the carbon source(s) and possible reagent(s), e.g. thiophene which contains sulphur, to promote the synthesis process. Then, the carbon source(s) decompose(s), and carbon HARM structures are formed on the catalyst particles resulting in an aerosol comprising HARM structures suspended in a carrier gas. The catalyst particles can be pre-fabricated so as to have controlled properties, e.g. a narrow size distribution to produce HARM structures with a controlled size distribution. The catalyst particles can be produced, for example, by a hot wire generator. The carbon source can comprise e.g. carbon monoxide CO. The reaction chamber can be formed of e.g. stainless steel. The temperature in the synthesis zone of the reactor can be e.g. about 900° C.

From the thus formed aerosol, the HARM structures can be collected into a deposit on a suitable surface to form a conductive layer of HARMS networks. The collection can be performed e.g. by leading the aerosol with the HARM structures through a filter or across a substrate, whereby the HARM structures are deposited on the filter or on the surface of the substrate. The resistance of the deposit thereby formed is a direct function of the amount of the HARM structures present in the deposit. The amount of the HARM structures in the deposit, in turn, is related to the concentration of the CNTs in the carrier gas (aerosol) and the duration of the collection. In general, the time required to produce a conductive layer with predetermined size and conductivity/resistivity is a function of the gas flows and the HARM structure synthesis rate. For example, if a mixture of 0.4 lpm of CO and 1% $CO_2$ is passed through a cartridge filled with a 1:4 Ferrocene-SiO2 mixture at room temperature, the mixture will have a partial pressure of about 0.8 Pa. A test was performed wherein this kind of mixture was introduced as a carbon source into a furnace with a maximum temperature of about 900° C. Those conditions resulted in a HARMS concentration in the aerosol, with which the collection time required to produce an A4-sized deposit area on a filter, having a resistivity of 10000Ω/square, was about 42 minutes.

If the HARM structures are collected by passing the aerosol through, for example, a HAWP filter medium offered by Millipore, the HARM structures can be transferred from the filter to a substrate formed of e.g. polyethylene terephthalate PET by simply placing the two materials in physical contact, for example by pressing the filter against the substrate. Due to the surface energy difference between the filter material and PET, the HARMS layer will inherently transfer to the PET substrate. The HARMS layer transferred onto the PET substrate tends to be rather loosely connected within itself and to the substrate. To improve the electrical connections between the individual HARM structures and bundles of them, and the physical adhesion to the PET, the HARMS layer can be immersed in a fluid, for example, ethanol. As the ethanol evaporates, the surface tension pulls the HARM structures together and into a better contact with the substrate. The next step is to form contact electrodes e.g. by printing silver ink onto the device. Finally, a protective dielectric layer can be formed, e.g. by printing, on the HARMS layer and the contacts.

The touch sensitive film 1 of FIG. 1 is configured to detect touches on the side of the conductive layer 3 which is opposite to the substrate 2. There is a dielectric layer 4 and a hard coat layer 5 superposed on the conductive layer 3. Among other things, the dielectric layer contributes to the capacitance between the conductive layer and the ambient. It also prevents galvanic contact between different points of the conductive layer via a conductive object in contact with the touch sensitive film, which is advantageous in the configurations like that of FIG. 1 arranged to detect touches on the "upper" side of the conductive layer 3, i.e. on the side opposite to the substrate 2. The dielectric layer thus improves the touch sensing performance of the film. However, it is not necessarily required in a touch sensitive device according to the present invention.

The purpose of the hard coat layer is to prevent scratching and increase the durability of the touch sensitive film 1. Examples of suitable materials are DuPont 7165™ and Solvay Solvene™ 250 EAP for the dielectric layer, and $Al_2O_3$ deposited by atomic layer deposition ALD for the hard coat layer, respectively. The dielectric layer thickness is preferably below 1000 microns, more preferably below 100 microns, and most preferably below 20 microns. As an alternative to separate dielectric and hard coat layers, if desired, the functions thereof could be combined in a single dielectric layer with sufficient hardness and scratch resistivity. Such layer can be formed, for example, by ALD from Ti-doped $Al_2O_3$ or as a double-layered composite of $HfO_2/Al_2O_3$.

In addition to the superior touch sensing properties of the touch sensitive film 1 of FIG. 1, the HARMS networks as the main material forming the conductive layer allow producing the touch sensitive film of FIG. 1 as a flexible and/or deformable structure. FIG. 3 illustrates this by presenting a mobile electronic device 6 having a touch screen 7 comprising a touch sensitive film 1 according to FIG. 1 bent or deformed along the curved side surface of the device having a radius of curvature r≈4 mm.

FIG. 1 shows, in addition to the touch sensitive film 1 itself, also metal electrodes 8 providing electrical connections between the conductive layer and the rest of the touch sensing device (not shown in FIG. 1). The electrodes 8 are formed on top of the edge of the conductive layer 3 and connected to conductive vias 9 extending through the substrate 2 and being further connected to contact pads 10 formed on the backside of the substrate 2. The contact pads 10 provide a contact interface for connecting the touch sensitive film to the rest of the touch sensing device. All the electrodes are connected to the same conductive layer 3, which means that the touch sensing device is configured to be operated in a single-layer mode. In a single-layer operation mode, the same conductive layer is used as well for supplying excitation signals as measuring response signals indicating, via changes therein, the presence of touches.

As FIGS. 1 and 2 show, the conductive layer 3 is, from macroscopic point of view, a continuous, non-patterned structure without any interruptions or holes therein.

FIG. 2 also shows the geometry of the entire electrode configuration of the touch sensing device of FIG. 1. The electrodes 8 are located at the edges of the conductive layer. The physical contact interfaces between the electrodes and the conductive area form contact regions 11 via which the conductive layer is electrically connected to the rest of the touch sensing device (not shown in FIG. 2). An imaginary joint line 12, marked as a dashed line in FIG. 2, joining each of the contact regions 11 to the two other contact regions closest thereto, forms a fictitious borderline which surrounds and defines a sensing region 13 within which touch detection is to be performed. The touch sensing device is configured to detect touches on the sensing region 13 on the basis of signals coupled between the conductive layer 3 and the rest of the device via the electrodes 8. In the example of FIG. 2, the sensing region 13 nearly coincides with the conductive layer 3. However, the electrodes 8 could be located also closer the centre of the conductive layer 3, i.e. at distances from the conductive area edges. Then, the sensing region 13 surrounded by the contact regions 11 would be limited to the centre portion of the conductive layer 3 only. Moreover, it is to be noted that the square forms of the conductive layer and the sensing region of FIG. 2 are examples only and the shapes of these are not restricted to any particular ones. The shape of the conductive layer 3 and/or the sensing region 13 therein can be also, for example, a rectangular with rounded corners, an ellipsoid, or a circle.

The electrodes 8 are located and their shapes and sizes are selected so as to provide the average distance d between the centers of two adjacent contact regions 11, as determined in the direction along the borderline 12 of the sensing region 13, about 13 times as large as the average width w of the contact regions in this same direction. As a further feature related to the electrode configuration, the number and placing of the electrodes 8 are selected so that when determining a straight connection line 14 over the sensing region 13 between the contact region 11 centres of each pair of two contact regions, these connection lines 14 form a plurality of intersections 15 thereof within the sensing region (only a part of those connection lines and intersections are marked in FIG. 2). As described earlier in this document, these features of the electrode number, geometry, and placement enable a very high sensitivity in detecting a touch and also a very good resolution in determining the touch location.

In operation, the touch location capability of the device is generally based on the fact that a touch changes the capacitive and/or inductive coupling between the location of the touch on the conductive layer 3 and the ambient or other points of the conductive layer. On the other hand, each of said connection lines 14 between the centres of two of the contact regions 11 coincide with a signal path, i.e. a path for current flow, over the sensing region between the respective electrodes. The effect of a touch on the touch sensitive film is naturally strongest in those signal paths which are closest to the location of the touch. This is the more detailed basis for determining the touch location. Thus, finding, by scanning through a plurality of signal paths in one direction, the signal path of the scanned ones which is most strongly influenced by the touch provides the information that the touch is located near this signal path or connection line 14. Finding, in addition, the signal path most strongly influenced by the touch in another direction produces the information that the touch is located near the intersection of these two differently directed signal paths or connection lines 14. By increasing the number of directions and/or the density of the connection lines 14 to be scanned around the roughly determined preliminary touch location, the location of the touch can be iterated more accurately. As a great advantage of the continuous conductive layer 3 extending throughout the sensing region 13 according to FIGS. 1 and 2, the signal paths used in scanning are not limited to some particular structures patterned into the conductive layer but can be freely chosen by just selecting any two of the contact regions. The more contact regions and thus possible different signal paths there are the more accurate touch location is possible.

Figure 4:
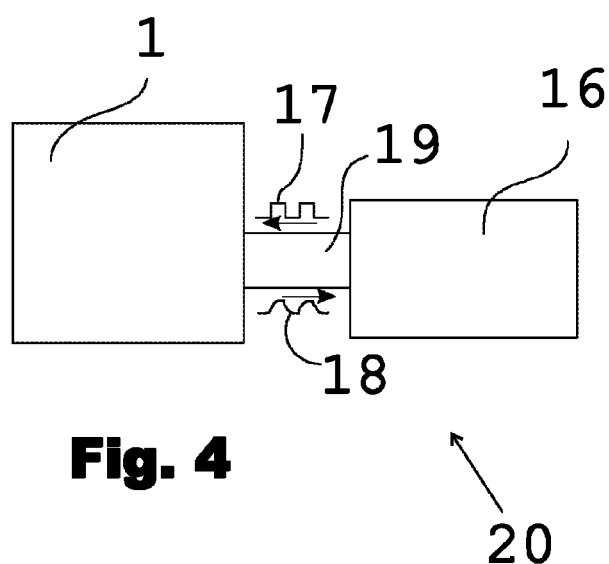
FIG. 4 presents, as a block diagram, a general structure of a touch sensing device according to the present invention.

The touch sensing device of FIG. 4 can be e.g. a touch screen of a mobile electronic device according to that of FIG. 3. The touch sensing device comprises a touch sensitive film 1, and a signal processing unit 16 for generating excitation signals 17 and controlling supply thereof to the touch sensitive film 1. The signal processing unit 16 is also responsible for receiving response signals 18 measured from the touch sensitive film 1, and for determining the presence and locations of touches on the basis of these signals. The signal processing unit 16 and the touch sensitive film are connected to each other by means of signal wirings 19. The device according to FIG. 4 is configured to couple an excitation signal 17 comprising an alternating current or voltage to the conductive layer of the touch sensitive film via one contact region thereon. This contact region then serves as an input point of the touch sensitive film. Another contact region on the conductive layer is used as an output point for measuring the response signal. This kind of measurement arrangement corresponds to transmitting a voltage or current signal through a filter and monitoring the changing of the signal between the output and input of the filter. By alternating current or voltage is meant above any signal form with an appropriate frequency and amplitude. Naturally, a sinusoidal signal form is a good choice, but e.g. a square form as illustrated in FIG. 4 can also be used.

The signal processing unit 16 of FIG. 4 also comprises means (not illustrated separately in the figure) for supplying haptic feedback signals to the conductive layer 3 for producing a haptic feedback in response to a touch on the touch sensitive film 1. The signal processing means 16 can, for example, comprise first circuitry means for supplying and receiving the signals 17, 18 for touch sensing, and second circuitry means for supplying the signals for haptic feedback, wherein the conductive layer is arranged to be coupled alternately to the first and the second circuitry means. In the example of FIG. 4, the haptic feedback is produced using the conductive layer 3 to produce suitable electromagnetic field(s) which the skin of the user of the device can feel as different sensations. It could also be possible to use the conductive layer 3 as a part of an electroactive polymer (artificial muscle) based haptic interface.

In the embodiment of FIG. 4, the key parameter monitored by the signal processing unit 16 is the phase displacement of the response signal 18 with respect to the excitation signal 17. In a touch sensitive film 1 according to the present invention, the phase displacements of the response signals measured from the conductive layer are very sensitive to capacitive and/or inductive coupling induced by a touch on or near the signal path being measured. This is a unique feature of the touch sensitive films according to the present invention; in conventional touch sensitive films, the sensitivity of the response signal phase displacement to the presence of touches is typically much lower. Moreover, the phase displacement (which can be expressed e.g. in terms of a phase angle) of a signal is less susceptible to disturbing interferences than the signal amplitude. Measuring the phase or phase displacement is also a relative measurement in contrast to amplitude which is an absolute parameter, leading to advantages in the stability and repeatability of the measurements.

Figure 5:
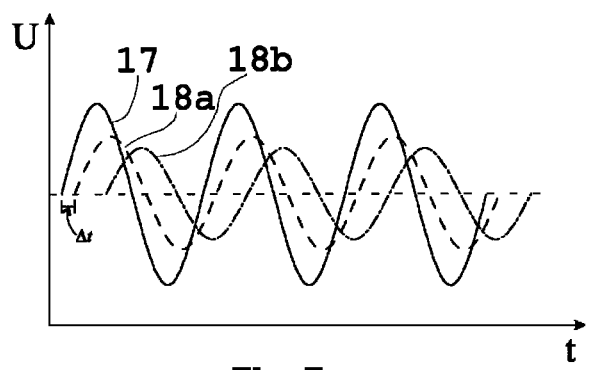
FIG. 5 illustrates the measurement principle of a touch sensing device according to the present invention.

Touch detection by measuring the phase displacement of the response signal is illustrated by means of the graph in FIG. 5 showing an excitation signal 17 and two response signals 18a, 18b coupled to and measured from the conductive layer of a touch sensitive film, respectively. The excitation signal is here a voltage comprising a sinusoidal alternating portion summarized to a DC level. The voltage 18a, 18b passed through the conductive layer is measured as the response signal. The response signal 18a, 18b is attenuated and shifted with respect to the excitation signal 17 by a time displacement $\Delta t$. The time displacement $\Delta t$ can be also expressed in terms of a phase displacement $\Delta\phi=2\pi f\Delta t$, where f is the signal frequency. The phase displacement $\Delta\phi$ can also be called phase angle of the response signal 18a, 18b with respect to the excitation signal 17. With no touch, the time displacement $\Delta t$ and the corresponding phase displacement $\Delta\phi$ of the response signal 18a, 18b are mainly due to the parasitic capacitance and/or inductance associated with the conductive layer, and are rather small. A touch near the signal path between the input and output points of the conductive layer changes the phase displacement $\Delta\phi$ between the response signal 18b and the excitation signal 17. This change of the phase displacement $\Delta(\Delta\phi)$ is thus the ultimate parameter indicating a touch.

In the example of FIG. 5, the change of the phase displacement $\Delta\phi=2\pi f\Delta t$ induced by a touch is positive, i.e. the touch increases the time displacement $\Delta t$ of the response signal 18b. However, this change can also be negative. It has been found that this can be true, for example, for a metallic object with a floating potential, i.e. not grounded e.g. via a person holding the object. Thus, in general, the direction of the change of the phase displacement can depend, for example, on the material of the pointer. The negative change can indicate that such metallic object couples to the measurement circuitry at least partially inductively.

It has been found that with a touch sensitive film according to the present invention, the frequency dependence of the phase angle change $\Delta(\Delta\phi)_{contact}$ due to a true contact by an object on the touch sensitive film differ from the corresponding frequency dependence of the phase angle change $\Delta(\Delta\phi)_{proximity}$ caused by an object brought to the proximity of the touch sensitive only, e.g. at a distance of about 1 cm from the touch sensitive film. This difference can be used to distinguish between a true contact and a proximate presence of an object. In other words, when a touch is detected, sequential measurements with two or more different frequencies can be used to determine whether there is an object in physical contact with or in the proximity of the touch sensitive film. For example, with one particular test sample with a conductive layer formed of HARMS networks and having a resistance in the sensing region of about 10 kΩ/square, the first and the second frequencies enabling this determination were 300 kHz and 1 MHz, respectively. The capability to distinguish between these two situations opens a great variety of new possibilities for designing a user interface utilizing a touch sensitive film according to the present invention.

In the test above, the size of the rectangular sample was 17×17 cm$^2$, and the configuration comprised 5 equidistant contact electrodes formed of silver at each side of the sample. Similar configuration has been successfully used to prove the capability of the present invention to detect not only touches by fingers but also the presence of different types of objects, e.g. a mobile phone, placed freely on different locations on the touch sensitive film.

Figure 6:
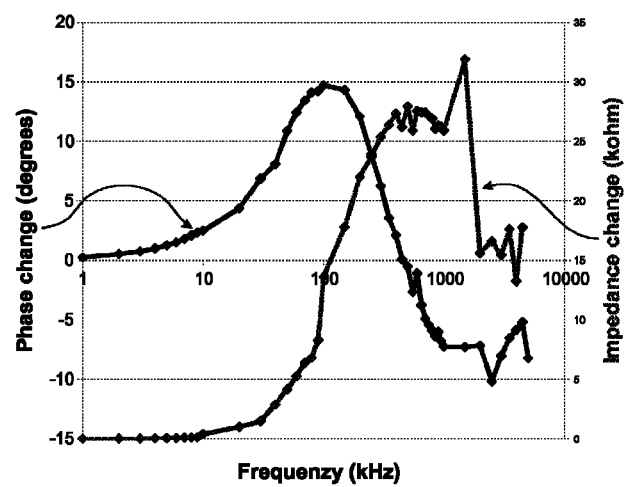
FIG. 6 illustrates the difference in the frequency dependence between the amplitude and the phase of the response signal.

FIG. 6 shows the sensitivity of real and complex parts of the impedance measured over a conductive layer according to the present invention having a sheet resistance of about 15 to 20 kΩ. In the notation used in the graph of FIG. 6, the real part of the impedance, the "impedance" is expressed in terms of ohms. The complex part of the impedance, the "phase", is expressed in terms of degrees of the phase angle. As is well known, the real part of the impedance, i.e. the "impedance" in FIG. 6, contributes to the amplitude of a signal transmitted over a conductive layer. The complex part of the impedance, i.e. the "phase" in FIG. 6, contributes to the phase of such signal.

The curves of FIG. 6 clearly shows that the maximum sensitivity of the "impedance" to a touch on the touch sensitive film is achieved at a frequency substantially lower than the corresponding frequency of the maximum sensitivity for the "phase". This means that when the touch detection is based on monitoring the phase of the response signal with respect to the excitation signal and changes therein, lower frequencies can be used than in the conventional approaches based on monitoring the response signal amplitude.

In the following, one exemplary touch detection process for a touch sensing device of FIG. 4 is described. Said process utilizes a touch sensitive film 1 according to that of the FIGS. 1 and 2 and the phase displacement monitoring illustrated in FIG. 5. The exemplary process starts by scanning through, without any touch present, all pairs of the contact regions 11 of the conductive layer, i.e. all signal paths or connection lines 14, to form a register of background or reference values of the phase angles Δϕ of the response signals. For each pair of the contact regions 11, one of the contact regions is used as an input point for supplying an excitation signal 17 of a first frequency to the conductive layer, and a response signal 18 is measured from the other contact region 11. This kind of background scan is needed because the different signal paths or connection lines have different lengths and thus provide different phase angles. Some variation in the phase angles of single signal paths can also be caused by possible non-uniformities of the conductive layer. After the background scan, the process is continued by scanning through repeatedly a more limited set of connection lines 14, e.g. every second or every third contact lines, possibly further limiting the scanning to parallel connection lines in one direction only. The phase angle Δϕ of each response signal 18 is compared with the corresponding background value. When a difference exceeding a predetermined threshold value is observed between the actual measurement and the background value for one or more connection lines 14, i.e. a touch is detected, measurements are repeated for this/these connection line(s) with a second frequency. The dependency of the phase angle change Δ(Δϕ) on the frequency is used to determine whether there is a pointer in a true contact or in the proximity of the touch sensitive film.

After having detected a touch and determined the type thereof, the next step is to determine the location of the touch. For this purpose, a denser grid of connection lines 14 close to the previously determined one or more connection lines with a phase angle change Δ(Δϕ) exceeding the threshold value is selected and scanned through. If connection lines 14 of one direction only were used in the previous stage, the first step, naturally, is to include into the selection connection lines 14 of at least one other direction. The selected connection lines are then scanned through. The intersection 15 of two connection lines 14, having different directions and showing the strongest changes in the phase angle Δϕ in the directions they represent, is the first rough estimate for the location of the touch. More than one clearly separate locations within the sensing region 13 producing threshold-exceeding values of the phase angle change Δ(Δϕ) indicate multiple simultaneous touches.

The process is then continued iteratively by selecting and scanning through more and more denser grids of connection lines 14 near the preliminary roughly estimated location of the touch(es) until a desired accuracy in touch location is achieved.

It is important to note that the above-described approach is one example of possible location determining algorithms only. The invention is not limited to any particular algorithm.

The process as described above can be performed by any known electronic and/or suitably configured software means embedded in the signal processing unit 16 or in other parts of the touch sensing device.

As an alternative to the touch sensing device assembly of FIGS. 1 and 2, FIG. 7 shows a conductive layer with a modulated resistivity. The conductive layer comprises first sub-regions 21 with a sheet resistance lower than that of the second sub-regions 22. Respectively, the conductivity in the first sub-regions 21 is higher than the conductivity in the second subregions 22. However, in both sub-regions, the sheet resistivity is in the range according to the present invention. This way modulated resistivity makes the overall resistance over the sensing region 13 dependent on the path along which the resistance is measured. For example, the electrical path with lowest resistance between the electrodes 8a and 8b is the straight connection line ab between these electrodes. With suitable selection of the sheet resistances of the first and second sub-regions, the electrical path with lowest resistance between the electrodes 8a and 8c can be, for instance, the combination of connection lines ab and bc instead of the straight connection line ac between the electrodes 8a and 8c. The signal path, i.e. the current flow path with a lowest total resistance between the electrodes 8a and 8c, on which path a signal between these contact electrodes will concentrate, thus deviates from the shortest connection line between these electrodes.

Each of the sub-regions 21, 22 has a form of a square. The higher-conducting squares 21 are connected to each other via the corners of the squares to form continuous paths with substantially uniform resistivity/conductivity between the electrodes 8. Instead of the alternating squares of FIG. 1, at least the first and second sub-region can also be formed, for instance, as a grid of lines.

Modulation of the resistivity along the sensing region can be used to increase the difference in signal between adjacent electrodes, thereby increasing the touch sensing accuracy. Not to be bound by the detailed physical theory, the inventors believe this is because the modulated resistivity can narrow the in-plane distribution of a signal between two opposing contact electrodes 8. With a narrow signal path, capacitive coupling of an object to the conductive layer somewhere between the opposing contact electrodes at issue will affect a larger fraction of the signal path and thus the signal. Therefore, the change in signal caused by the touch or proximate presence of an object is increased, thus enabling an increased touch sensing accuracy.

A conductive film with a modulated resistivity can be manufactured, for instance, by depositing or otherwise forming first the conductive material uniformly and removing afterwards all or part of the material in the areas of one of the sub-regions, by depositing or otherwise forming the conductive layer so as to have different amounts of a conductive material in different sub-regions, or by modifying the conductivity in subregions of one type, for instance, by doping.

As is clear for a person skilled in the art, the invention is not limited to the examples described above but the embodiments can freely vary within the scope of the claims.

The invention claimed is:

1. A touch sensing device, comprising:
   a touch sensitive film comprising:
   a conductive layer having a sensing region,
   wherein a sheet resistance of the conductive layer in the sensing region is higher than or equal to 3 k$\Omega$/sq, in all directions of the conductive layer, and
   wherein the conductive layer, at a macroscopic scale, forms a solid, monolithic and non-oriented structure;
   a circuitry configured to
   supply an electrical excitation signal to the sensing region of the conductive layer, and
   receive an electrical response signal from the sensing region of the conductive layer; and
   a processor configured to
   process the electrical response signal, and
   detect a touch on the basis of the processed electrical response signal,
   wherein the processor is further configured to
   determine a phase displacement between the response signal and the excitation signal, based on phase angles of the response signal and the excitation signal, and
   detect the touch within the sensing region on the basis of the phase displacement,
   wherein the sensing region is electrically connected to the circuitry via a plurality of contact regions on the conductive layer, and the contact regions define a borderline encircling the sensing region, and
   wherein, as determined in the direction along said borderline, an average distance between centers of the two adjacent contact regions is at least 10 times as large as an average width of the contact regions in the direction.

2. The touch sensing device according to claim 1, wherein the sheet resistance of the conductive layer in the sensing region is in the range of 5 k$\Omega$/sq to 100 k$\Omega$/sq.

3. The touch sensing device according to claim 1, wherein the conductive layer extends over the entire sensing region, as a solid structure.

4. The touch sensing device according to claim 1, wherein the sensing region comprises:
   at least one first sub-region having a first sheet resistance; and
   at least one second sub-region having a second sheet resistance, and
   wherein the first sheet resistance and the second sheet resistance are different from each other.

5. The touch sensing device according to claim 1, wherein the conductive layer comprises a high aspect ratio molecular structure (HARMS) network, an oxide or a polymer.

6. The touch sensing device according to claim 1, wherein the touch sensitive film further comprises a flexible structure configured to allow bending of the touch sensitive film.

7. The touch sensing device according to claim 1, wherein the touch sensitive film further comprises a deformable structure configured to allow deforming of the touch sensitive film.

8. The touch sensing device according to claim 1, wherein the touch sensitive film is optically transparent.

9. The touch sensing device according to claim 1, wherein a number and places of the contact regions are determined so that when determining a straight connection line over the sensing region between centers of the contact regions of each pair of the contact regions, there is a plurality of intersections of said connection lines within the sensing region.

10. The touch sensing device according to claim 1, wherein the processor is further configured to generate a haptic feedback signal to be supplied by the circuitry to the touch sensitive film for providing a haptic feedback.

11. The touch sensing device according to claim 10, wherein the conductive layer is further configured to generate the haptic feedback in response to the haptic feedback signal.

12. The touch sensing device according to claim 11, wherein the conductive layer is further configured to generate at least one electromagnetic field based on the haptic feedback to a user.

13. The touch sensing device according to claim 1,
    wherein a number and places of the contact regions are determined so that when determining a straight connection line over the sensing region between centers of the contact regions of each pair of the contact regions, connection line intersections are distributed uniformly over the entire sensing region.

* * * * *